US011905399B2

(12) United States Patent
Ikura et al.

(10) Patent No.: US 11,905,399 B2
(45) Date of Patent: Feb. 20, 2024

(54) RESIN FORMED BODY AND RESIN COMPOSITION

(71) Applicant: FURUKAWA ELECTRIC CO., LTD., Tokyo (JP)

(72) Inventors: Yukihiro Ikura, Tokyo (JP); Suzune Ito, Tokyo (JP); Yasuo Nakajima, Tokyo (JP); Kenichi Suyama, Tokyo (JP); Jae Kyung Kim, Tokyo (JP); Hiroki Tanaka, Tokyo (JP); Isao Tomomatsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 521 days.

(21) Appl. No.: 17/201,674

(22) Filed: Mar. 15, 2021

(65) Prior Publication Data

US 2021/0198463 A1   Jul. 1, 2021

Related U.S. Application Data

(63) Continuation of application No. PCT/JP2019/038950, filed on Oct. 2, 2019.

(30) Foreign Application Priority Data

Oct. 3, 2018 (JP) ................................. 2018-188394

(51) Int. Cl.
| | |
|---|---|
| *C08L 23/12* | (2006.01) |
| *C08L 23/26* | (2006.01) |
| *C08L 1/02* | (2006.01) |
| *C08F 8/46* | (2006.01) |
| *B29C 55/12* | (2006.01) |
| *C08F 10/06* | (2006.01) |
| *B29K 23/00* | (2006.01) |
| *B29K 105/14* | (2006.01) |

(52) U.S. Cl.
CPC .............. *C08L 23/12* (2013.01); *B29C 55/12* (2013.01); *C08F 8/46* (2013.01); *C08F 10/06* (2013.01); *C08L 1/02* (2013.01); *B29K 2023/12* (2013.01); *B29K 2105/14* (2013.01); *C08L 23/26* (2013.01); *C08L 2205/16* (2013.01)

(58) Field of Classification Search
CPC .. C08L 23/12; C08L 1/02; C08L 23/26; C08L 2205/16; B29C 55/12; C08F 8/46; C08F 10/06; B29K 2023/12; B29K 2105/14
See application file for complete search history.

(56) References Cited

U.S. PATENT DOCUMENTS

| | | | |
|---|---|---|---|
| 4,409,345 A | 10/1983 | Moteki et al. | |
| 2003/0004233 A1 | 1/2003 | Yamaguchi et al. | |
| 2014/0343196 A1 | 11/2014 | Kousaka et al. | |
| 2015/0361254 A1 | 12/2015 | Yasuda et al. | |
| 2017/0334105 A1 | 11/2017 | Mikami et al. | |
| 2018/0037704 A1 | 2/2018 | Ishiguro et al. | |

FOREIGN PATENT DOCUMENTS

| | | | | |
|---|---|---|---|---|
| CN | 1371939 | A | | 10/2002 |
| CN | 103813893 | A | | 5/2014 |
| JP | 57-115437 | A | | 7/1982 |
| JP | 8-283475 | A | | 10/1996 |
| JP | 11-12401 | A | | 1/1999 |
| JP | 2004-256806 | A | | 9/2004 |
| JP | 2009-167249 | A | | 7/2009 |
| JP | 2009167249 | A | * | 7/2009 |
| JP | 2011-523430 | A | | 8/2011 |
| JP | 5762674 | B2 | | 8/2015 |
| JP | 2016-94541 | A | | 5/2016 |
| JP | 2016-160267 | A | | 9/2016 |
| JP | 2017-210595 | A | | 11/2017 |
| JP | 2017210595 | A | * | 11/2017 ............. B29B 11/16 |
| JP | 2017-226754 | A | | 12/2017 |
| JP | 2017226754 | A | * | 12/2017 |
| JP | 2018-109138 | A | | 7/2018 |

(Continued)

OTHER PUBLICATIONS

Japanese Notice of Reasons for Refusal for corresponding Japanese Application No. 2020-550509 dated Jun. 20, 2023, with an English translation.
Chinese Office Action and Search Report for corresponding Chinese Application No. 201980058113.8, dated Feb. 28, 2023, with an English translation.
Huang et al., "Transcrystallization of Polypropylene in the Presence of Polyester/Cellulose Nanocrystal Composite Fibers," Carbohydrate Polymers, vol. 167, 2017, pp. 1-35, 36 pages total.
Tian et al., "In Situ Synchrotron Radiation X-Ray Scattering and Diffraction Measurement Studies on Structure and Morphology of Fibers," Progress in Chemistry, vol. 25, No. 10, 2013, pp. 1752-1762, 12 pages total, with an English abstract.

(Continued)

*Primary Examiner* — K. Boyle
(74) *Attorney, Agent, or Firm* — Birch, Stewart, Kolasch & Birch, LLP

(57) ABSTRACT

A resin formed body obtained from a resin composition that contains a polypropylene resin and a cellulose fiber, the polypropylene resin partially containing an acid modified polypropylene resin, wherein the resin formed body has a diffraction peak derived from a polypropylene α-crystal (040) plane at a position of a scattering vector s of $1.92\pm0.1$ nm$^{-1}$, a diffraction peak derived from a polypropylene β-crystal (300) plane at a position of a scattering vector s of $1.83\pm0.1$ nm$^{-1}$, and a diffraction peak derived from a cellulose I$_\beta$ type crystal (004) plane at a position of a scattering vector s of $3.86\pm0.1$ nm$^{-1}$, observed in a wide-angle X-ray diffraction measurement, and wherein an orientation degree of the cellulose fiber in the resin formed body is larger than 0.1 and less than 0.8.

16 Claims, No Drawings

(56) References Cited

FOREIGN PATENT DOCUMENTS

WO  WO 2009/139508 A1  11/2009

OTHER PUBLICATIONS

Extended European Search Report for European Application No. 19869899.5, dated Jun. 20, 2022.
International Search Report for PCT/JP2019/038950 dated Oct. 29, 2019.

* cited by examiner

RESIN FORMED BODY AND RESIN COMPOSITION

CROSS-REFERENCE TO RELATED APPLICATIONS

This application is a Continuation of PCT International Application No. PCT/JP2019/038950 filed on Oct. 2, 2019, which claims priority under 35 U.S.C. § 119 (a) to Japanese Patent Application No. 2018-188394 filed in Japan on Oct. 3, 2018. Each of the above applications is hereby expressly incorporated by reference, in its entirety, into the present application.

TECHNICAL FIELD

The present invention relates to a resin formed body and a resin composition appropriate for preparing the formed body.

BACKGROUND ART

Recently, many studies have been conducted on thermoplastic resin composite materials reinforced by a plant-derived organic fiber including a cellulose fiber. The organic fiber includes cellulose fibers, wood flours, jute fibers, and the like. It has been known that when the organic fiber is used as the reinforcement material, the weight is reduced compared with the reinforcement by conventionally used glass fiber and the specific intensity is increased.

For example, Patent Literature 1 discloses a composite resin composition using a polypropylene resin and plant fibers in which the amount of organic solvent extractable components is adjusted.

CITATION LIST

Patent Literatures

Patent Literature 1: Japanese Patent No. 5762674

SUMMARY OF INVENTION

Technical Problem

The inventors examined conventional plant fiber-reinforced polypropylene resin compositions including the technique disclosed in Patent Literature 1, and have found that formed bodies of the plant fiber-reinforced polypropylene resin compositions have not yet been sufficiently satisfactory in mechanical property, especially, high level of tensile strength, required for materials recent transport equipment and the like.

The present invention has an object to provide a resin formed body excellent in mechanical physical property, such as a tensile strength, and a resin composition appropriate for preparing the formed body.

Solution to Problem

The inventors examined physical properties of a fiber-reinforced polypropylene resin formed body containing an organic fiber and a polypropylene resin, and found that the mechanical properties (tensile strength and the like) of the fiber-reinforced polypropylene resin formed body can be sufficiently enhanced by using a cellulose fiber as the organic fiber and making polypropylene have a specific crystalline structure. The present invention is completed with further examination based on these findings.

That is, the above-described problem of the present invention was solved by the following means.

<1>

A resin formed body obtained from a resin composition that contains a polypropylene resin and a cellulose fiber, the polypropylene resin partially containing an acid modified polypropylene resin, wherein the resin formed body has a diffraction peak derived from a polypropylene α-crystal (040) plane at a position of a scattering vector s of $1.92\pm0.1$ nm$^{-1}$, a diffraction peak derived from a polypropylene β-crystal (300) plane at a position of a scattering vector s of $1.83\pm0.1$ nm$^{-1}$, and a diffraction peak derived from a cellulose I$_\beta$ type crystal (004) plane at a position of a scattering vectors of $3.86\pm0.1$ nm$^{-1}$, observed in a wide-angle X-ray diffraction measurement, and wherein an orientation degree of the cellulose fiber in the resin formed body is larger than 0.1 and less than 0.8.

<2>

A resin formed body obtained from a resin composition that contains a polypropylene resin and a cellulose fiber, wherein the resin formed body has a diffraction peak derived from a polypropylene α-crystal (040) plane at a position of a scattering vector s of $1.92\pm0.1$ nm$^{-1}$, a diffraction peak derived from a polypropylene β-crystal (300) plane at a position of a scattering vector s of $1.83\pm0.1$ nm$^{-1}$, and a diffraction peak derived from a cellulose I$_\beta$ type crystal (004) plane at a position of a scattering vector s of $3.86\pm0.1$ nm$^{-1}$, observed in a wide-angle X-ray diffraction measurement, wherein an orientation degree of the cellulose fiber in the resin formed body is larger than 0.1 and less than 0.8, and wherein a tensile strength of the resin formed body is 40 MPa or more and 60 MPa or less.

<3>

The resin formed body according to <2>, wherein the tensile strength of the resin formed body is 42.9 MPa or more.

<4>

The resin formed body according to <1>, wherein the polypropylene resin contains a maleic anhydride modified polypropylene resin.

<5>

The resin formed body according to any one of <1> to <4>, wherein a ratio ([Pβ/Pα]×100) of a diffraction peak area (Pβ) of the diffraction peak derived from the polypropylene β-crystal (300) plane observed at the position of the scattering vectors of $1.83\pm0.1$ nm$^{-1}$ to a diffraction peak area (Pα) of the diffraction peak derived from the polypropylene α-crystal (040) plane observed at the position of the scattering vectors of $1.92\pm0.1$ nm$^{-1}$ is more than 0% and less than 50%, in the wide-angle X-ray diffraction measurement of the resin formed body.

<6>

The resin formed body according to any one of <1> to <5>, wherein the orientation degree of the cellulose fiber in the resin formed body is 0.2 or more and 0.6 or less.

<7>

The resin formed body according to any one of <1> to <6>, wherein the resin formed body has not been subjected to a stretching treatment using a biaxial stretching machine.

<8>

The resin formed body according to any one of <1> to <6>, wherein a crystallinity of the polypropylene in the resin formed body is 10 to 70%.

<9>

A resin composition for use in preparing the resin formed body according to any one of <1> to <8>, wherein the diffraction peak derived from the polypropylene α-crystal (040) plane at the position of the scattering vector s of $1.92\pm0.1$ nm$^{-1}$ and the diffraction peak derived from the cellulose I$_\beta$ type crystal (004) plane at the position of the scattering vector s of $3.86\pm0.1$ nm$^{-1}$ are observed in the wide-angle X-ray diffraction measurement.

<10>

The resin composition according to <9>, wherein the polypropylene resin contained in the resin composition contains an acid modified polypropylene resin.

<11>

The resin composition according to <10>, wherein the acid modified polypropylene resin contains a maleic anhydride modified polypropylene resin.

Advantageous Effects of Invention

The resin formed body of the present invention is excellent in mechanical physical property, such as tensile strength, and appropriate for a material and the like of transport equipment and the like. The resin composition of the present invention can be appropriately used for preparing the resin formed body.

DESCRIPTION OF EMBODIMENTS

[Resin Formed Body]

A resin formed body of the present invention has diffraction peaks at respective positions of scattering vectors of $1.92\pm0.1$ nm$^{-1}$, $1.83\pm0.1$ nm$^{-1}$, and $3.86\pm0.1$ nm$^{-1}$, observed in a wide-angle X-ray diffraction measurement. The diffraction peak at the position of the scattering vector s of $1.92\pm0.1$ nm$^{-1}$ is the diffraction peak derived from a polypropylene α-crystal (040) plane, the diffraction peak at the position of $1.83\pm0.1$ nm$^{-1}$ is the diffraction peak derived from a polypropylene β-crystal (300) plane, and the diffraction peak at the position of $3.86\pm0.1$ nm$^{-1}$ is the diffraction peak derived from a cellulose I$_\beta$-type crystal (004) plane in a cellulose fiber.

Here, an overlapping part (1.82 nm$^{-1}$ to 1.93 nm$^{-1}$) exists between the position of $1.92\pm0.1$ nm$^{-1}$ and the position of $1.83\pm0.1$ nm$^{-1}$ of the scattering vector s, and the diffraction peak derived from the α-crystal (040) plane and/or derived from the β-crystal (300) plane can be observed in this overlapping part in some cases. In such a case, the diffraction peak at the position of $1.92\pm0.1$ nm$^{-1}$ and having a larger value of the scattering vector s of the two diffraction peaks is defined as the peak derived from the α-crystal (040) plane, and the diffraction peak at the position of $1.83\pm0.1$ nm$^{-1}$ and having a smaller value of the scattering vector s is defined as the diffraction peak derived from the β-crystal (300) plane. When the diffraction peaks overlap in the overlapping part and cannot be separated into two, it is assumed that any of them is not included.

That is, the resin formed body of the present invention is a fiber-reinforced polypropylene resin formed body that contains a polypropylene resin and a cellulose fiber, and at least a part of polypropylene of the polypropylene resin forms the α-crystal and the β-crystal. The polypropylene resin may be an unmodified product or a modified product, and preferably contains an unmodified polypropylene resin. The polypropylene resin preferably contains an acid modified polypropylene resin together with the unmodified polypropylene resin.

The following describes components of the resin formed body of the present invention.

(Cellulose Fiber)

The cellulose fiber for use in the present invention is a fibrous cellulose, and specially, a fine plant fibrous kraft pulp fiber (powdered pulp) is preferable. The pulp is also a raw material of paper, and contains a tracheid extracted from a plant as a main component. From a chemical view, the main component is a polysaccharide, and its main component is cellulose.

The origin of the cellulose fiber for use in the present invention is not specifically limited, thus including, for example, a cellulose fiber obtained from a raw material, such as wood, bamboo, hemp, jute, kenaf, agricultural waste (for example, straw of wheat, rice, and the like, maize, stem of cotton and the like, sugarcane), cloth, recycled pulp, and used paper. The cellulose fiber for use in the present invention is especially preferably a cellulose fiber derived from wood. The cellulose fiber is a generic term of pulp fibers obtained by removing lignin and hemicellulose from a raw material plant, such as wood, by chemical processing of caustic soda or the like, and extracting almost pure cellulose.

When the wood, the jute fiber, or the like, which does not go through the above-described chemical processing to cause the lignin and the like to remain, is kneaded with a polypropylene resin to obtain a formed body, it becomes difficult to cause the polypropylene to form a desired β-crystal. It is considered that this is partly because an interaction between the polypropylene resin and the cellulose is inhibited by the lignin. When it fails to cause the polypropylene to form the desired β-crystal, it becomes difficult to give a desired mechanical property to the formed body.

The cellulose fiber for use in the present invention has a diameter of preferably 1 to 30 μm, more preferably 1 to 25 μm, and further preferably 5 to 20 μm. The length (fiber length) of the cellulose fiber is preferably 10 to 2200 μm, and more preferably 50 to 1000 μm.

The diameter of the cellulose fiber contained in the formed body can be measured by a scanning electron microscope (SEM) and a fiber analyzer. The fiber length of the cellulose fiber also can be measured by the SEM observation. In the measurement of the fiber length by the SEM observation, a residue after eluting a polypropylene resin in a fiber-reinforced polyolefin resin formed body by using a hot xylene is placed on a stage, and processing, such as vapor deposition, is performed, thus allowing determination of the fiber length by the SEM observation.

The content of the cellulose fiber in the resin formed body is preferably 1 to 40 mass parts, and especially preferably 5 to 30 mass parts, in 100 mass parts of the total amount of the polypropylene resin and the cellulose fiber.

(Polypropylene Resin)

The polypropylene resin for use in the present invention is not specifically limited, and for example, any of homopolypropylene, polypropylene block copolymer, or polypropylene random copolymer can be used.

Specific examples of polypropylene in the polypropylene resin include a propylene homopolymer, a propylene-ethylene random copolymer, a propylene-α-olefin random copolymer, a propylene-ethylene-α-olefin copolymer, and a propylene block copolymer (copolymer that contains a propylene homopolymer component or copolymer component that mainly contains propylene, and a copolymer component obtained by copolymerizing at least one monomer selected from ethylene and α-olefin with propylene). These polypropylene resins may be used singly or two or more kinds thereof may be used in combination.

As α-olefin for use in a polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, a propylene-1-octene random copolymer, and the like.

Specific examples of propylene-ethylene-α-olefin copolymer include a propylene-ethylene-1-butene copolymer, a propylene-ethylene-1-hexene copolymer, a propylene-ethylene-1-octene copolymer, and the like.

Specific examples of the propylene block copolymer include
a (propylene)-(propylene-ethylene) copolymer,
a (propylene)-(propylene-ethylene-1-butene) copolymer,
a (propylene)-(propylene-ethylene-1-hexene) copolymer,
a (propylene)-(propylene-1-butene) copolymer,
a (propylene)-(propylene-1-hexene) copolymer,
a (propylene-ethylene)-(propylene-ethylene) copolymer,
a (propylene-ethylene)-(propylene-ethylene-1-butene) copolymer,
a (propylene-ethylene)-(propylene-ethylene-1-hexene) copolymer,
a (propylene-ethylene)-(propylene-1-butene) copolymer,
a (propylene-ethylene)-(propylene-1-hexene) copolymer,
a (propylene-1-butene)-(propylene-ethylene) copolymer,
a (propylene-1-butene)-(propylene-ethylene-1-butene) copolymer,
a (propylene-1-butene)-(propylene-ethylene-1-hexene) copolymer,
a (propylene-1-butene)-(propylene-1-butene) copolymer,
a (propylene-1-butene)-(propylene-1-hexene) copolymer,
and the like.

Among these polypropylene resins, homo-polypropylene, propylene-ethylene-1-octene copolymer, or polypropylene block copolymer is preferable from the aspect of a tensile strength and an impact resistance.

The fluidity of the polypropylene resin is also not limited, and a polypropylene resin having appropriate fluidity in consideration of the thickness, the volume, or the like of the formed body can be used.

One polypropylene resin may be used alone, or two or more may be mixed for use.

The content of the polypropylene resin in the resin formed body of the present invention is preferably 60 to 99 mass parts, and especially preferably 70 to 95 mass parts, in 100 mass parts of the total amount of the polypropylene resin and the cellulose fiber.

The polypropylene resin preferably partially contains a polypropylene resin which has not been modified with an acid (acid modified polypropylene resin).

When the acid modified polypropylene resin is contained, the polypropylene β-crystal can be more efficiently formed, and the mechanical strength of the formed body can be effectively increased together with an adhesiveness improving effect between the polypropylene resin which has not been modified with an acid and the cellulose fiber caused by the acid modified polypropylene resin. Furthermore, the orientation degree of the cellulose fiber can be more increased, and this is also considered to contribute to the improvement of the mechanical property of the formed body.

The acid modified polypropylene resin includes the one obtained by modifying the above-described polypropylene resin with for example, unsaturated carboxylic acid or its derivative. The unsaturated carboxylic acid includes, for example, maleic acid, fumaric acid, itaconic acid, acrylic acid, and methacrylic acid, and the unsaturated carboxylic acid derivative includes, for example, maleic anhydride and itaconic acid anhydride.

The acid modified polypropylene resin preferably contains maleic acid modified polypropylene and/or maleic anhydride modified polypropylene.

The content of the acid modified polypropylene resin in the resin formed body is preferably 0.3 mass parts to 20 mass parts, and especially preferably 1 mass parts to 15 mass parts, in 100 mass parts of the total amount of the polypropylene resin (sum of the polypropylene resin which has not been modified with an acid and the acid modified polypropylene resin) and the cellulose fiber. By setting the content of the acid modified polypropylene resin in the above-described range, the mechanical property of the resin formed body can be more improved.

(Other Additives)

The resin formed body of the present invention may have the above-described configuration that contains the polypropylene resin and the cellulose fiber, or may contain additives and the like below in a range in which the effect of the invention is not impaired.

For example, an elastomer of ethylene-α-olefin copolymer or the like may be additionally combined to modify the physical property of the resin formed body.

Into the resin formed body of the present invention, other additives can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant, and a flame retardant aid.

(Crystalline Structure of Polypropylene)

It has been known that polypropylene adopts various crystalline structures, such as an α-crystal and a β-crystal. The α-crystal is a monoclinic crystal, and the β-crystal is a hexagonal crystal.

The resin formed body of the present invention has the diffraction peak derived from the polypropylene α-crystal (040) plane at the position of the scattering vectors of $1.92\pm0.1$ $nm^{-1}$ and the diffraction peak derived from the polypropylene β-crystal (300) plane at the position of the scattering vector s of $1.83\pm0.1$ $nm^{-1}$ each observed in the wide-angle X-ray diffraction measurement. That is, in the resin formed body of the present invention, at least a part of the polypropylene has the crystalline structure, and at least a part of it is the α-crystal and the β-crystal (that is, a part of the crystalline structure is the α-crystal, and a part of the crystalline structure is the β-crystal). The crystalline structure other than the α-crystal and the β-crystal occupied in the crystalline structure of the polypropylene is not specifically limited.

In the resin formed body of the present invention, the crystallinity of polypropylene (proportion of crystalline structure occupied in polypropylene, total crystallinity in other words) is preferably 10 to 70%, and more preferably 25 to 60%. A proportion (hereinafter also referred to as a proportion A) of the total area of all the diffraction peaks derived from the α-crystal occupied in the crystalline structure of the polypropylene (total area of all the diffraction peaks derived from the α-crystal and all the diffraction peaks derived from the (3-crystal) is preferably 80 to 99%, more preferably 85 to 99%, and further preferably 85 to 97%. A proportion (hereinafter also referred to as a proportion B) of the area of the diffraction peak derived from the β-crystal (300) plane occupied in the crystalline structure of the polypropylene is preferably 0.4 to 20%, more preferably 1 to 20%, further preferably 1 to 15%, and especially preferably 3 to 15%. The crystallinity can be obtained, by separating the amorphous component and the crystal component from one-dimensional data obtained by the wide-angle X-ray diffraction measurement described later, and obtaining a proportion ($[P_C/(P_C+P_H)] \times 100$) of a diffraction peak area ($P_C$) derived from crystal components to a sum of a diffraction peak area ($P_H$) derived from amorphous components and the diffraction peak area ($P_C$) derived from crystal components. The proportion A and the proportion B can be each obtained from diffraction peak areas (Psumα and Pβ, respectively) obtained by the wide-angle X-ray diffraction measurement described later (proportion A=[Psumα/$P_C$]×100, proportion B=[Pβ/$P_C$]×100).

In the resin formed body of the present invention, a proportion (proportion C=[Pα/$P_C$]×100) of an area of the diffraction peak derived from the α-crystal (040) plane occupied in the crystalline structure of the polypropylene (total area of all the diffraction peaks derived from the α-crystal and all the diffraction peaks derived from the β-crystal) is preferably 11.5 to 40%, and more preferably 11.9 to 30%. The proportion C can be obtained from a diffraction peak area (Pα) derived from the α-crystal (040) plane obtained by the wide-angle X-ray diffraction measurement described later.

(Ratio of β-Crystal to α-Crystal)

In the crystalline structure of the polypropylene, a ratio ([Pβ/Pα]×100, also referred to as a ratio of the β-crystal to the α-crystal) of the diffraction peak area (Pβ) of the diffraction peak at the position of the scattering vector s of $1.83 \pm 0.1$ nm$^{-1}$ (diffraction peak derived from β-crystal (300) plane) to the diffraction peak area (Pα) of the diffraction peak at the position of the scattering vector s of $1.92 \pm 0.1$ nm$^{-1}$ (diffraction peak derived from α-crystal (040) plane), determined by a method described later, is preferably more than 0% and less than 50%. By setting the ratio of the β-crystal to the α-crystal in the preferable range described above, the mechanical property and the elastic modulus can be more enhanced. When the β-crystal is completely absent, the interfacial adhesion between the cellulose fiber and the polypropylene is poor, thus impairing the mechanical property in some cases. The ratio of the β-crystal to the α-crystal is more preferably 2% or more and less than 30%, further preferably 3% or more and less than 25%, and especially preferably 4% or more and less than 20%.

(Method for Confirming α-Crystal and β-Crystal)

The X-ray diffraction measurement can be used for confirming the presence of the α-crystal and the β-crystal. The wide-angle X-ray diffraction measurement is preferably used. In a case of a common injection-molded body, intensity distribution occurs in an azimuthal direction derived from resin orientation in some cases. Therefore, since a one-dimensional scintillation counter fails to accurately capture the intensity distribution derived from orientation in some cases, a two-dimensional detector is preferably used as the detector. CuKα ray is preferably used as an X-ray source, and the shape for use is preferably a pinhole. The beam diameter of the X-ray is preferably 5 μm to 1500 μm, and more preferably 7 μm to 1000 μm. The beam diameter larger than 1500 μm cannot obtain a sufficient position resolution, and is not suitable for detailed analysis in some cases. In a case of less than 5 μm, the irradiation intensity is not sufficient due to the small beam diameter, and the measurement time is significantly lengthened, thus decreasing the measurement efficiency in some cases.

Specifically, it can be performed by a method described in the example section.

(Method for Determining Ratio of β-Crystal to α-Crystal)

The ratio of the β-crystal to the α-crystal is determined using one-dimensional data obtained by integrating and averaging a two-dimensional diffraction image obtained by the X-ray diffraction measurement described above, in a circumferential direction. The upper limit of the integration range for one-dimensionalizing the measurement data by integrating and averaging is preferably 90° or more, more preferably larger than 180°, and further preferably 360°.

To determine the ratio of the β-crystal to the α-crystal, peak separation of the obtained one-dimensional data is performed using a Gaussian function. The peak separation is preferably performed in a range of the scattering vector s of 1.35 to 2.80 nm$^{-1}$ (2θ=12° to 25°) when a CuKα ray is used in the measurement. When the scattering vector s is less than 1.35 nm$^{-1}$, information by small-angle scattering and information by air scattering are mixed, and further, the diffraction due to crystal is hardly observed in the case of the polypropylene resin used this time. When the scattering vector s exceeds 2.80 nm$^{-1}$ (large angle side with respect to 25°), a plurality of diffraction peaks due to the crystal are observed, thus making the separation difficult.

After the separation of the diffraction peaks into those derived from the α-crystal and those derived from the β-crystal in the range of the scattering vector s of 1.35 to 2.80 nm$^{-1}$, a ratio of a diffraction peak area derived from the β-crystal (300) plane to a diffraction peak area derived from the α-crystal (040) plane is obtained, thus determining the ratio of the β-crystal to the α-crystal.

Specifically, it can be performed by a method described in the example section. As a way of expressing a diffraction angle of the X-ray, the diffraction angle is preferably expressed using the scattering vector s normalized by a wavelength because the diffraction angle changes depending on the wavelength of the X-ray used. The scattering vector s can be expressed as $s = 2 \sin \theta / \lambda$ using the X-ray diffraction angle 2θ and the X-ray wavelength λ. The θ means ½ of the diffraction angle 2θ. The way of expressing the diffraction angle is the same in the measurement of the cellulose fiber.

(Method for Determining Presence/Absence of Cellulose Fiber)

It has been known that cellulose of a cellulose fiber adopts various crystalline structures, such as a type I and a type II. Natural cellulose has a crystalline structure of a type $I_\alpha$ (triclinic crystal) or a type $I_\beta$ (monoclinic crystal), and plant-derived cellulose generally contains a lot of type $I_\beta$ crystals.

The resin formed body of the present invention has the diffraction peak at the position of the scattering vector s of $3.86 \pm 0.1$ nm$^{-1}$ in the wide-angle X-ray diffraction measurement. This diffraction peak is derived from a (004) plane of the $I_\beta$ type crystal of the cellulose. That is, in the resin formed body of the present invention, at least a part of the cellulose of the cellulose fiber has the crystalline structures, and at least a part of them is the $I_\beta$ type crystal. The crystalline structures other than the $I_\beta$ type crystal in the crystalline structures of the cellulose are not specifically limited. Hereinafter, the cellulose fiber is referred to as a "component having the diffraction peak at the position of the scattering vector s of 3.86±0.1 nm$^{-1}$" in some cases.

Containing the cellulose fiber can be confirmed by various methods. For example, it can be confirmed by observing the diffraction peak derived from cellulose crystal in the cellulose fiber using the X-ray. While it is necessary to be careful because the diffraction peak position differs depending on the wavelength of the X-ray used, the diffraction peak derived from the (004) plane of the I$_\beta$ type crystal of the cellulose can be observed in the proximity of the scattering vector s of 3.86 nm$^{-1}$ (2θ=34.6°) when the CuKα ray (λ=0.15418 nm) is used. For capturing the diffraction of the (004) plane, the X-ray needs to be incident on a sample that is rotated by a degree of θ. That is, when the CuKα ray is used, a sample stage is to be rotated by θ=17.3°. While other diffraction peaks as the diffraction peaks derived from the cellulose crystal can be observed inside the (004) plane, their diffraction positions overlap with that of a diffraction peak derived from polypropylene, thus it is not possible to determine them as definite diffraction peaks in some cases. In view of this, in this description, the presence/absence of the cellulose fiber is determined using the diffraction peak of the I$_\beta$ type crystal (004) plane of the cellulose.

(Orientation Degree of Cellulose Fiber)

The orientation degree of the cellulose fiber (component having the diffraction peak at the position of scattering vectors of 3.86±0.1 nm$^{-1}$) is more than 0.1 and less than 0.8. By setting the orientation degree of the cellulose fiber to more than 0.1 and less than 0.8, the mechanical property can be more enhanced.

When the improvement of the mechanical property in a normal direction with respect to the arrangement of the cellulose fiber is also considered, the orientation degree of the cellulose fiber is more preferably 0.15 or more and 0.7 or less, and further preferably 0.2 or more and 0.6 or less.

(Method for Measuring Orientation Degree of Cellulose Fiber)

The orientation degree of the cellulose fiber can be obtained by analyzing profiles in an azimuthal direction of diffraction intensities derived from the cellulose (004) plane based on the two-dimensional diffraction image of the X-ray obtained according to the above-described confirmation method of containing the cellulose fiber. The analysis method includes a method for analysis using a half-value width of the diffraction peak in the azimuthal direction, and a method for obtaining using an orientation function. For the confirmation of the orientation degree of the cellulose fiber, the sample may be cut out to be devised so as to obtain a satisfactory diffraction image. More specifically, for example, it is included that the sample is cut out at any given position for the purpose of adjusting absorption of the X-ray by the sample, thereby adjusting the thickness to approximately 0.5 to 2 mm.

(Detailed Method for Calculating Orientation Degree of Cellulose Fiber)

The X-ray diffraction pattern derived from the I$_\beta$ type crystal (004) plane of the cellulose of the cellulose fiber is used to determine the orientation degree of the cellulose fiber. The two-dimensional diffraction pattern of the I$_\beta$ type crystal (004) plane of the cellulose of the cellulose fiber is one-dimensionalized into data of azimuth angle versus intensity. For one-dimensionalizing the two-dimensional data, one-dimensionalization is performed in a range of ±0.5° centered on 34.6° of the I$_\beta$ type crystal (004) plane of the cellulose of the cellulose fiber. Since the diffraction peak derived from the polypropylene resin is also present nearby, in order to eliminate its influence, the one-dimensionalization can be performed in ranges of ±0.5° centered on 33.6° and 35.6°, and an average value of them can be subtracted from the one-dimensional diffraction intensity of the I$_\beta$ type crystal of the cellulose of the cellulose fiber. While the orientation degree is determined for the corrected data of the azimuth angle diffraction intensity of the I$_\beta$ type crystal of the cellulose of the cellulose fiber, any of a half-value width method that uses the half-value width for calculation or an orientation function method using the orientation function may be used for the determination of the orientation degree. When obtaining the orientation function or the half-value width, the analysis may be performed using a function obtained in the peak separation, in order to reduce a noise of data obtained by using a method, such as a peak separation of diffraction intensity in the azimuthal direction. An operation of the above-described intensity correction or the like may be performed together with this operation. The function used for the peak separation and the fitting is preferably a Gaussian function or a Lorentz function, and more preferably a Gaussian function.

The tensile strength of the resin formed body of the present invention is preferably 40 MPa or more and 60 MPa or less, and more preferably 42.9 MPa or more and 60 MPa or less. The tensile strength can be measured according to JIS K7161.

The resin formed body of the present invention is excellent in mechanical property, such as a tensile strength. While its reason is not clear, it is considered as follows.

Generally, the polypropylene β-crystal has a low elastic modulus, and when the ratio of the β-crystal to the α-crystal of the polypropylene in the resin formed body is excessively increased, the resin formed body tends to be easily collapsed. That is, the resin formed body containing many β-crystals tends to be poor in tensile modulus of elasticity and tensile strength.

However, in the present invention, by the use of the cellulose fiber close to pure cellulose in combination with the polypropylene resin, for example, the interaction in the interface between the polypropylene resin and the cellulose fiber is improved. In addition to this, an effect of improving β-crystal formation efficiency by the cellulose fiber, and containing the cellulose fiber with the specific orientation degree also have the influence. Thus, the mechanical property of the resin formed body is considered to be enhanced.

A preferred aspect of the resin formed body of the present invention is the resin formed body obtained from the resin composition that contains the polypropylene resin and the cellulose fiber, and the polypropylene resin is partially containing the acid modified polypropylene resin. The resin formed body has the diffraction peak derived from the polypropylene α-crystal (040) plane at the position of the scattering vector s of 1.92±0.1 nm$^{-1}$, the diffraction peak derived from the polypropylene β-crystal (300) plane at the position of 1.83±0.1 nm$^{-1}$, and the diffraction peak derived from the cellulose I$_\beta$ type crystal (004) plane at the position of 3.86±0.1 nm$^{-1}$, observed in the wide-angle X-ray diffraction measurement. The orientation degree of the cellulose fiber in the resin formed body is larger than 0.1 and less than 0.8.

In addition, another preferred aspect of the resin formed body of the present invention is the resin formed body obtained from the resin composition that contains the polypropylene resin and the cellulose fiber. The resin formed body has the diffraction peak derived from the polypropylene α-crystal (040) plane at the position of the scattering vector s of 1.92±0.1 nm$^{-1}$, the diffraction peak derived from the polypropylene β-crystal (300) plane at the position of 1.83±0.1 nm$^{-1}$, and the diffraction peak derived from the cellulose I$_β$ type crystal (004) plane at the position of 3.86±0.1 nm$^{-1}$, observed in the wide-angle X-ray diffraction. The orientation degree of the cellulose fiber in the resin formed body is larger than 0.1 and less than 0.8. The tensile strength of the resin formed body is 40 MPa or more and 60 MPa or less.

[Resin Composition]

The resin composition of the present invention is a resin composition appropriate for preparing the above-described resin formed body, and the resin composition that has the diffraction peak derived from the polypropylene α-crystal (040) plane at the position of the scattering vector s of 1.92±0.1 nm$^{-1}$, and the diffraction peak derived from the cellulose I$_β$ type crystal (004) plane at the position of 3.86±0.1 nm$^{-1}$, observed in the wide-angle X-ray diffraction measurement. The resin composition of the present invention contains the above-described polypropylene resin and cellulose fiber as its components, and the polypropylene of the polypropylene resin forms the α-crystal.

The resin composition of the present invention may further contain the above-described additives, solvent, and the like.

The polypropylene resin, the cellulose fiber, and additives other than above are the same as those described in the above-described resin formed body, and the preferred configuration is also the same. The preferred contents of the respective components in the resin composition are also the same to the preferred contents described in the resin formed body described above.

In the resin composition of the present invention, the polypropylene may form the β-crystal, or need not form the β-crystal.

[Production of Resin Formed Body and Resin Composition]

The resin composition of the present invention can be produced by an ordinary method except that the above-described components are used. For example, the resin composition of the present invention can be obtained by mixing the polypropylene resin and the cellulose fiber using a mixer and the like, or by melt-kneading them.

In the case of the melt-kneading, the melt-kneading temperature is not specifically limited insofar as it is a temperature equal to or more than the melting point of the polypropylene resin used, and the melt-kneading temperature is preferably 160 to 230° C., and more preferably 170 to 210° C.

The upper limit of the melt-kneading temperature is preferably a temperature at which the cellulose fiber is less pyrolyzed. Accordingly, the upper limit temperature is preferably 250° C. or less, more preferably 230° C. or less, and further preferably 200° C. or less.

The melt-kneading period can be appropriately set.

The device used for the melt-kneading is not specifically limited insofar as the melt-kneading can be conducted at the melting temperature of the polypropylene resin. For example, a blender, a kneader, a mixing roll, a banbury mixer, and a single-screw or twin-screw extruder are included, and the twin-screw extruder is preferable.

From the aspect of handleability at forming, the obtained melt-kneaded material is preferably processed into a pellet.

In advance of the melt-kneading, the components may be dry blended.

The method for producing the resin formed body of the present invention is not specifically limited insofar as the α-crystal and the β-crystal of the polypropylene can be formed and the orientation degree of the cellulose fiber can be set to larger than 0.1 and less than 0.8, using each component described above.

The resin formed body of the present invention is preferably produced through at least a step of melt-kneading the polypropylene resin and the cellulose fiber and forming the melt-kneaded material into a targeted shape. Producing by melting the resin composition of the present invention and molding the melted material in a targeted shape is also preferable. The resin formed body of the present invention is preferably formed by an injection molding.

In the production of the resin formed body of the present invention, the α-crystal and the β-crystal of the polypropylene are preferably formed in the formed body at a desired level in the forming step. For example, the α-crystal and the β-crystal can be formed by the injection molding or the like of the melt-kneaded material (resin composition) obtained in the melt-kneading. The degree of formation of the α-crystal and the β-crystal can be controlled to some extent by the forming condition.

The forming step preferably includes a step of cooling the obtained formed body. The α-crystal and the β-crystal can be efficiently formed in the resin formed body through the cooling step. In the cooling step, the cooling of the formed body is preferably performed at a rate of 2° C./min or more. In the case of the injection molding, the temperature of a mold is preferably set to a temperature 100° C. or more lower than an injection resin temperature.

Since the interaction in the interface with the cellulose fiber strongly acts on the α-crystal and the β-crystal, the α-crystal and the β-crystal tend to be efficiently formed by adjusting the amount of the cellulose fiber, decreasing the cooling rate, and/or increasing a crystallization temperature to perform isothermal crystallization.

The orientation degree tends to be efficiently set to a desired range, by adjusting the resin temperature at the injection molding, increasing the injection speed, and/or the like. While the resin temperature (injection resin temperature) at the injection molding cannot be unambiguously specified because it is affected by the producing condition and the like including the combination of the components, the resin temperature is preferably 170 to 220° C., and more preferably 180 to 200° C. in the case of the polypropylene resin. The injection speed is preferably 10 to 150 mm/s (second), and more preferably 20 to 100 mm/s.

The resin formed body preferably has not been subjected to a stretching treatment using a biaxial stretching machine and the like.

(Applications)

The resin formed body of the present invention can be used as materials of products, components and/or members, and the like below. For example, transport equipment (automobile, motorcycle, train, aircraft, and the like), a structural member of a robot arm, a component of an amusement robot, a member of an artificial limb, a material of a home appliance, a housing of OA equipment, information processing equipment, a mobile terminal, a building material, a film for plastic greenhouse, drainage equipment, a material of a toiletry product, various kinds of tanks, a container, a sheet, a packing material, a toy, and sport goods, are included.

The material for the transport equipment includes a vehicle material. The vehicle material includes, for example, interior components, such as a door trim, a pillar, an instrumental panel, a console, a rocker panel, an arm rest, a door inner panel, a spare tire cover, a door knob, and a light; exterior components, such as a bumper, a spoiler, a fender, a side step, and a door outer panel; and in addition, an air intake duct, a coolant reservoir tank, a radiator reservoir tank, an window washer tank, a fender liner, a rotating member, such as a fan and a pulley; a component, such as a wire harness protector, a connection box or a connector, and an integrally molded component, such as a front end panel.

EXAMPLES

The present invention will be described in more detail based on examples given below, but the invention is not meant to be limited by these.

In the examples and comparative examples below, "parts" means "mass parts" unless otherwise stated.

In the following examples, the polypropylene resin which has not been modified with an acid is simply referred to as the "polypropylene resin" for convenience, and is distinguished from the acid modified polypropylene resin.

—Used Materials—

The following shows the used materials.
(Cellulose Fiber)
Product name: ARBOCEL B400, manufactured by RETTENMAIER Co. Ltd. caustic soda treated product
(Wood Flour)
Wood flour: wood of Japanese cypress material not treated with caustic soda was passed through a screen of 40 to 100 μm mesh to be screened, and those having the average fiber length of 30 μm were used.
(Polypropylene Resin)
Product name: J106MG, manufactured by Prime Polymer Co., Ltd.
(Acid Modified Polypropylene Resin)
Product name: RIKEAID MG670P, maleic anhydride modified polypropylene, manufactured by RIKEN VITAMIN CO., LTD.
Product name: RIKEAID MG400P, maleic anhydride modified polypropylene, manufactured by RIKEN VITAMIN CO., LTD.
Product name: RIKEAID MG250P, maleic anhydride modified polypropylene, manufactured by RIKEN VITAMIN CO., LTD.

Example 1

The cellulose fiber of 20 mass parts, and RIKEAID MG670P as the acid modified polypropylene resin of 5 mass parts were added to the polypropylene resin of 75 mass parts, and the mixture was dry blended, and subjected to a 15 mm twin-screw extruder (manufactured by TECHNOVEL CORPORATION). After melt-kneading, the resin discharged from extrusion dies was subjected to water cooling, and then processed into a pellet using a strand cutter, thus obtaining the resin composition. This resin composition (pellet) was sufficiently dried, and subsequently, forming was performed at an injection resin temperature 190° C., a mold temperature 40° C., and an injection speed 30 mm/s with an injection molding machine (ROBOSHOT α-S30iA, manufactured by FANUC CORPORATION), thus obtaining a resin formed body in a shape of JIS No. 5 dumbbell (hereinafter referred to as a dumbbell test piece).

Example 2

A dumbbell test piece was produced in the same manner as in Example 1 except that the acid modified polypropylene resin of Example 1 was changed to RIKEAID MG400P.

Example 3

A dumbbell test piece was produced in the same manner as in Example 2 except that the addition amount of the acid modified polypropylene resin of Example 2 was changed to 1 mass parts, the addition amount of the polypropylene resin of Example 2 was changed to 79 mass parts, and the injection speed of Example 2 was changed to 40 mm/s.

Example 4

A dumbbell test piece was produced in the same manner as in Example 2 except that the addition amount of the acid modified polypropylene resin of Example 2 was changed to 3 mass parts, the addition amount of the polypropylene resin of Example 2 was changed to 77 mass parts, and the injection speed of Example 2 was changed to 50 mm/s.

Example 5

A dumbbell test piece was produced in the same manner as in Example 2 except that the addition amount of the cellulose fiber of Example 2 was changed to 10 mass parts, and the addition amount of the polypropylene resin of Example 2 was changed to 85 mass parts.

Example 6

A dumbbell test piece was produced in the same manner as in Example 2 except that the addition amount of the cellulose fiber of Example 2 was changed to 40 mass parts, and the addition amount of the polypropylene resin of Example 2 was changed to 55 mass parts.

Comparative Example 1

A dumbbell test piece was produced in the same manner as in Example 1 except that the acid modified polypropylene resin was not added and the addition amount of the polypropylene resin was changed to 80 mass parts.

Comparative Example 2

A dumbbell test piece was produced in the same manner as in Example 1 except that the addition amount of the polypropylene resin of Example 1 was changed to 95 mass parts, and the addition amount of the acid modified polypropylene resin of Example 1 was changed to 5 mass parts.

Comparative Example 3

A dumbbell test piece was produced in the same manner as in Example 1 except that the acid modified polypropylene resin was not added and the addition amount of the cellulose fiber was changed to 25 mass parts.

Comparative Example 4

A dumbbell test piece was produced in the same manner as in Example 1 except that the cellulose fiber of Example 1 was changed to wood flour.

Comparative Example 5

ARBOCEL B400 (manufactured by RETTENMAIER Co. Ltd.) as the cellulose fiber of 20 mass parts and RIKEAID MG250P (manufactured by RIKEN VITAMIN CO., LTD.) as the acid modified polypropylene resin of 5 mass parts were added to J106MG (manufactured by Prime Polymer Co., Ltd.) as the polypropylene resin of 75 mass parts, and the mixture was dry blended, and provided to the 15 mm twin-screw extruder (manufactured by TECH-NOVEL CORPORATION). After melt-kneading, the resin discharged from extrusion dies was subjected to water cooling, and was processed into a pellet using a strand cutter, thus obtaining the resin composition. This resin composition (pellet) was sufficiently dried, and subsequently, a resin sheet of 120 mm×120 mm×2 mm was obtained under the condition of a preheating time: 5 minutes, a pressurization time: 5 minutes, and a pressure: 20 MPa with a heat press machine (product name: MP-WCH, manufactured by Toyo Seiki Seisaku-sho, Ltd.) heated to 200° C. The resin sheet was punched, thus obtaining a resin formed body in a shape of JIS No. 5 dumbbell.

Comparative Example 6

A JIS No. 5 dumbbell was obtained in the same manner as in Example 1 except that the acid modified polypropylene resin of Example 1 of 5 mass parts was changed to RIKEAID MG250P (manufactured by RIKEN VITAMIN CO., LTD.) of 1 mass parts, and the addition amount of the polypropylene resin of Example 1 was changed to 79 mass parts.

The following evaluations were performed using the dumbbell test pieces obtained in Examples 1 to 6 and Comparative Examples 1 to 6 described above. Table 1 shows the obtained results.

The wide-angle X-ray diffraction measurement below was performed also for the pellets (resin composition of the present invention) prepared in Examples 1 to 6, and the diffraction peaks were observed at the positions of the scattering vectors of $1.92 \pm 0.1$ nm$^{-1}$ and $3.86 \pm 0.1$ nm$^{-1}$ for every pellet.

(Tensile Strength Measurement)

The tensile strength of the dumbbell test pieces were measured using an autograph precision universal testing machine (manufactured by Shimadzu Corporation). The tension speed was set to 50 mm/min.

(Wide-Angle X-Ray Diffraction Measurement)

—Method for Confirming α-Crystal and β-Crystal—

The confirmation was performed by the wide-angle X-ray diffraction measurement using D8 DISCOVER (manufactured by Bruker AXS). The set dumbbell test piece was irradiated with a CuKα ray by a pinhole collimator narrowed down to φ0.5 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 0 to 2.91 nm$^{-1}$ in an azimuthal direction of 0 to 360°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals and diffraction components derived from amorphous materials. When the diffraction peak was confirmed at the position of the scattering vectors of $1.83 \pm 0.1$ nm$^{-1}$ to the result of performing the component separation, it was determined that the β-crystal was present. This is because the diffraction peak derived from the polypropylene β-crystal (300) plane appears at the position of the scattering vector s of $1.83 \pm 0.1$ nm$^{-1}$. When the diffraction peak was confirmed at the position of the scattering vector s of $1.92 \pm 0.1$ nm$^{-1}$, it was determined that the α-crystal was present. This is because the diffraction peak derived from the polypropylene α-crystal (040) plane appears at the position of the scattering vectors of $1.92 \pm 0.1$ nm$^{-1}$. By dividing the diffraction peak area derived from the β-crystal (300) plane of the scattering vectors of $1.83 \pm 0.1$ nm$^{-1}$ by the diffraction peak area derived from the α-crystal (040) plane of the scattering vector s of $1.92 \pm 0.1$ nm$^{-1}$, the ratio of the β-crystal to the α-crystal (diffraction peak area derived from β-crystal (300) plane/diffraction peak area derived from α-crystal (040) plane ([Pβ/Pα]×100)) was calculated. The scattering vector s can be obtained as s=2 sin θ/λ using the angle 2θ of the obtained diffraction image and the incident X-ray wavelength λ.

—Method for Confirming Presence of Cellulose Fiber—

The confirmation was performed by the wide-angle X-ray diffraction measurement using D8 DISCOVER (manufactured by Bruker AXS). The dumbbell test piece set in a state where the sample stage was inclined by θ=17.3° was irradiated with a CuKα ray by a pinhole collimator narrowed down to φ1.0 mm to obtain diffraction, and the obtained diffraction was detected by a two-dimensional detector VANTEC 500 (manufactured by Bruker AXS) set to a camera length of 10 cm, thus obtaining a two-dimensional diffraction image. An integral averaging process was performed to the obtained two-dimensional diffraction image in a range of the scattering vector s of 1.13 to 4.44 nm$^{-1}$ in an azimuthal direction of 0 to 120°, thus obtaining one-dimensional data. After a correction of subtracting air scattering according to a transmittance of the X-ray was performed to the one-dimensional data, a curve fitting was performed using a Gaussian function, thus separating diffraction components derived from polypropylene crystals (α-crystal and β-crystal) and diffraction components derived from the cellulose fiber. When the diffraction peak was observed in a range of the scattering vector s of $3.86 \pm 0.1$ nm$^{-1}$, it was determined that the cellulose fiber was present in the formed body. This is because the diffraction peak derived from the cellulose fiber (004) plane ordinarily appears in a range where the s is $3.86 \pm 0.1$ nm$^{-1}$.

—Method for Confirming Orientation Degree of Cellulose Fiber—

The orientation degree was determined using the data in a range of the azimuthal direction of 0 to 90° of the two-dimensional diffraction image derived from the cellulose fiber and obtained by the above-described method for confirming the presence of the cellulose fiber. An orientation function of the azimuthal direction was used for determining the orientation degree. The orientation degree was obtained as an average value of results of the measurement at any given three points of a test piece that was adjusted to have the thickness of 0.5 to 1.5 mm and cut out from the dumbbell test piece.

(Method for Obtaining Crystallinity, Proportion A, Proportion B, and Proportion C)

The total crystallinity was obtained as a proportion ([$P_C$/($P_C+P_H$)]×100) of the diffraction peak area ($P_C$) derived from the crystal component in the sum of the diffraction peak area ($P_H$) derived from the amorphous component and the diffraction peak area ($P_C$) derived from the crystal component, in a range of the scattering vector s of 1.36 to 2.81 nm$^{-1}$ by separating the result of the curve fitting using the Gaussian function into the amorphous component and the crystal component.

Furthermore, a sum (Psumα) of all the diffraction peak areas derived from the α-crystal, a diffraction peak area (Pβ) derived from the β-crystal (300) plane, and a diffraction peak area (Pα) derived from the α-crystal (040) plane were obtained from the result of the curve fitting, thereby obtaining each of the proportion A ([Psumα/$P_C$]×100), the proportion B ([Pβ/$P_C$]×100), and the proportion C ([Pα/$P_C$]×100) in the crystal component.

TABLE 1

|  |  | Ex 1 | Ex 2 | Ex 3 | Ex 4 | Ex 5 | Ex 6 |
|---|---|---|---|---|---|---|---|
| Polypropylene Resin [mass parts] | J106MG | 75 | 75 | 79 | 77 | 85 | 55 |
| Acid modified polypropylene resin [mass parts] | MG670P | 5 | — | — | — | — | — |
|  | MG400P | — | 5 | 1 | 3 | 5 | 5 |
| Cellulose Fiber [mass parts] | B400 | 20 | 20 | 20 | 20 | 10 | 40 |
| Wood Flour [mass parts] |  | — | — | — | — | — | — |
| $1.83 \pm 0.1$ nm$^{-1}$ |  | Observed | Observed | Observed | Observed | Observed | Observed |
| $1.92 \pm 0.1$ nm$^{-1}$ |  | Observed | Observed | Observed | Observed | Observed | Observed |
| $3.86 \pm 0.1$ nm$^{-1}$ |  | Observed | Observed | Observed | Observed | Observed | Observed |
| $[P\beta/P\alpha] \times 100$ [%] |  | 13.8 | 10.2 | 4.2 | 6.4 | 5.4 | 6.0 |
| Orientation Degree of Cellulose Fiber |  | 0.25 | 0.29 | 0.34 | 0.54 | 0.38 | 0.38 |
| Total crystallinity of polypropylene [%] |  | 35.7 | 37.4 | 35.7 | 37.2 | 40.1 | 34.0 |
| Proportion A | $[Psum\alpha/P_C] \times 100$[%] | 95.9 | 97.1 | 99.5 | 98.1 | 98.9 | 98.4 |
| Proportion B | $[P\beta/P_C] \times 100$[%] | 4.1 | 2.9 | 0.5 | 1.9 | 1.1 | 1.6 |
| Proportion C | $[P\alpha/P_C] \times 100$[%] | 29.7 | 28.4 | 11.9 | 29.7 | 20.4 | 26.7 |
| Tensile Strength [MPa] |  | 43.9 | 42.9 | 45.4 | 44.6 | 43.2 | 50.6 |

|  |  | CEx 1 | CEx 2 | CEx 3 | CEx 4 | CEx 5 | CEx 6 |
|---|---|---|---|---|---|---|---|
| Polypropylene resin [mass parts] | J106MG | 80 | 95 | 75 | 75 | 75 | 79 |
| Acid modified polypropylene resin [mass parts] | MG670P | — | 5 | — | 5 | — | — |
|  | MG400P | — | — | — | — | — | — |
|  | MG250P | — | — | — | — | 5 | 1 |
| Cellulose Fiber [mass parts] | B400 | 20 | — | 25 | — | 20 | 20 |
| Wood Flour [mass parts] |  | — | — | — | 20 | — | — |
| $1.83 \pm 0.1$ nm$^{-1}$ |  | Not observed | Not observed | Not observed | Not observed | Observed | Not observed |
| $1.92 \pm 0.1$ nm$^{-1}$ |  | Observed | Observed | Observed | Observed | Observed | Observed |
| $3.86 \pm 0.1$ nm$^{-1}$ |  | Observed | Not observed | Observed | Observed | Observed | Observed |
| $[P\beta/P\alpha] \times 100$ [%] |  | 0 | 0 | 0 | 0 | 35.3 | 0 |
| Orientation Degree of Cellulose Fiber |  | 0.05 | — | 0.08 | 0.05 | 0.05 | 0.25 |
| Total crystallinity of polypropylene [%] |  | 34.5 | 42.2 | 34.0 | 35.2 | 36.3 | 39.7 |
| Proportion A | $[Psum\alpha/P_C] \times 100$[%] | 100.0 | 100.0 | 100.0 | 100.0 | 96.4 | 100 |
| Proportion B | $[P\beta/P_C] \times 100$[%] | 0.0 | 0.0 | 0.0 | 0.0 | 3.6 | 0 |
| Proportion C | $[P\alpha/P_C] \times 100$[%] | 11 | 10.9 | 10.5 | 10.3 | 10.2 | 10.7 |
| Tensile Strength [MPa] |  | 36.5 | 37.9 | 38.8 | 39.8 | 37.0 | 38.6 |

Note:
"Ex" stands for Example
"CEx" stands for comparative example

From Table 1, Comparative Examples 1 to 4, which did not have the diffraction peak at any position of the scattering vectors of $1.92\pm0.1$ nm$^{-1}$, $1.83\pm0.1$ nm$^{-1}$, and $3.86\pm0.1$ nm$^{-1}$ in the wide-angle X-ray diffraction measurement, each resulted to be poor in tensile strength. Comparative Example 5 excessively low in orientation degree of the cellulose fiber resulted to be poor in tensile strength.

In contrast, Examples 1 to 6, which had the diffraction peaks at the positions of the scattering vector s of $1.92\pm0.1$ nm$^{-1}$, $1.83\pm0.1$ nm$^{-1}$, and $3.86\pm0.1$ nm$^{-1}$, were each excellent in tensile strength.

Examples 1 to 6 each had the crystallinity in a range of 30 to 45%, and the proportion A in a range of 80 to 99% and the proportion B in a range of 3 to 15% in the crystal component.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2018-188394 filed in Japan on Oct. 3, 2018, which is entirely herein incorporated by reference.

The invention claimed is:

1. A resin formed body obtained from a resin composition that contains a polypropylene resin and a cellulose fiber, the polypropylene resin partially containing an acid modified polypropylene resin,
wherein the resin formed body has a diffraction peak derived from a polypropylene α-crystal (040) plane at a position of a scattering vector s of $1.92\pm0.1$ nm$^{-1}$, a diffraction peak derived from a polypropylene β-crystal (300) plane at a position of a scattering vector s of $1.83\pm0.1$ nm$^{-1}$, and a diffraction peak derived from a cellulose I$_\beta$ type crystal (004) plane at a position of a scattering vector s of $3.86\pm0.1$ nm$^{-1}$, observed in a wide-angle X-ray diffraction measurement, and
wherein an orientation degree of the cellulose fiber in the resin formed body is larger than 0.1 and less than 0.8.

2. A resin formed body obtained from a resin composition that contains a polypropylene resin and a cellulose fiber,
wherein the resin formed body has a diffraction peak derived from a polypropylene α-crystal (040) plane at a position of a scattering vector s of $1.92\pm0.1$ nm$^{-1}$, a diffraction peak derived from a polypropylene β-crystal (300) plane at a position of a scattering vector s of $1.83\pm0.1$ nm$^{-1}$, and a diffraction peak derived from a cellulose I$_\beta$ type crystal (004) plane at a position of a scattering vectors of 3.86±0.1 nm$^{-1}$, observed in a wide-angle X-ray diffraction measurement, wherein an orientation degree of the cellulose fiber in the resin formed body is larger than 0.1 and less than 0.8, and wherein a tensile strength of the resin formed body is 40 MPa or more and 60 MPa or less.

3. The resin formed body according to claim 2, wherein the tensile strength of the resin formed body is 42.9 MPa or more and 60 MPa or less.

4. The resin formed body according to claim 1, wherein the polypropylene resin contains a maleic anhydride modified polypropylene resin.

5. The resin formed body according to claim 2, wherein the polypropylene resin contains a maleic anhydride modified polypropylene resin.

6. The resin formed body according to claim 1, wherein a ratio ([9β/Pα]×100) of a diffraction peak area (Pβ) of the diffraction peak derived from the polypropylene β-crystal (300) plane observed at the position of the scattering vector s of 1.83±0.1 nm$^{-1}$ to a diffraction peak area (Pα) of the diffraction peak derived from the polypropylene α-crystal (040) plane observed at the position of the scattering vectors of 1.92±0.1 nm$^{-1}$ is more than 0% and less than 50%, in the wide-angle X-ray diffraction measurement of the resin formed body.

7. The resin formed body according to claim 2, wherein a ratio ([Pβ/Pα]×100) of a diffraction peak area (Pβ) of the diffraction peak derived from the polypropylene β-crystal (300) plane observed at the position of the scattering vector s of 1.83±0.1 nm$^{-1}$ to a diffraction peak area (Pα) of the diffraction peak derived from the polypropylene α-crystal (040) plane observed at the position of the scattering vectors of 1.92±0.1 nm$^{-1}$ is more than 0% and less than 50%, in the wide-angle X-ray diffraction measurement of the resin formed body.

8. The resin formed body according to claim 1, wherein the orientation degree of the cellulose fiber in the resin formed body is 0.2 or more and 0.6 or less.

9. The resin formed body according to claim 2, wherein the orientation degree of the cellulose fiber in the resin formed body is 0.2 or more and 0.6 or less.

10. The resin formed body according to claim 1, wherein the resin formed body has not been subjected to a stretching treatment using a biaxial stretching machine.

11. The resin formed body according to claim 2, wherein the resin formed body has not been subjected to a stretching treatment using a biaxial stretching machine.

12. The resin formed body according to claim 1, wherein a crystallinity of the polypropylene in the resin formed body is 10 to 70%.

13. The resin formed body according to claim 2, wherein a crystallinity of the polypropylene in the resin formed body is 10 to 70%.

14. A resin composition for use in preparing the resin formed body according to claim 1, wherein the resin composition has a diffraction peak derived from the polypropylene α-crystal (040) plane at the position of the scattering vector s of 1.92±0.1 nm$^{-1}$ and the diffraction peak derived from the cellulose I$_β$ type crystal (004) plane at the position of the scattering vectors of 3.86±0.1 nm$^{-1}$ are observed in the wide-angle X-ray diffraction measurement.

15. The resin composition according to claim 14, wherein the polypropylene resin contained in the resin composition contains an acid modified polypropylene resin.

16. The resin composition according to claim 15, wherein the acid modified polypropylene resin contains a maleic anhydride modified polypropylene resin.

* * * * *